US011809260B2

(12) United States Patent
McAfee et al.

(10) Patent No.: US 11,809,260 B2
(45) Date of Patent: Nov. 7, 2023

(54) PHASE SHEDDING BASED ON PHASE EFFICIENCY DETERMINED BY PULSE WIDTH MODULATOR SWITCHING OF VOLTAGE REGULATOR FIELD EFFECT TRANSISTORS

(71) Applicant: Advanced Micro Devices, Inc., Santa Clara, CA (US)

(72) Inventors: Martin McAfee, Austin, TX (US); David L Wigton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/029,042

(22) Filed: Sep. 23, 2020

(65) Prior Publication Data

US 2022/0091661 A1 Mar. 24, 2022

(51) Int. Cl.
*G06F 1/32* (2019.01)
*G06F 1/3296* (2019.01)
*G06F 1/28* (2006.01)
*G06F 1/3287* (2019.01)
*H02M 3/155* (2006.01)

(52) U.S. Cl.
CPC ............... *G06F 1/3296* (2013.01); *G06F 1/28* (2013.01); *G06F 1/3287* (2013.01); *H02M 3/155* (2013.01)

(58) Field of Classification Search
CPC ........ G06F 1/28; G06F 1/3296; G06F 1/3287; H02M 3/155
See application file for complete search history.

(56) References Cited

U.S. PATENT DOCUMENTS

| 5,119,244 | A | * | 6/1992 | Hardeng | G11B 20/10212 360/45 |
| 8,493,343 | B2 | * | 7/2013 | Goo | G06F 3/045 345/173 |
| 2008/0180108 | A1 | * | 7/2008 | Pracht | G01R 31/40 324/523 |
| 2010/0250913 | A1 | | 9/2010 | Breen, III et al. | |
| 2011/0309811 | A1 | | 12/2011 | Kondo et al. | |
| 2015/0188428 | A1 | * | 7/2015 | Leung | H02M 3/156 323/271 |
| 2015/0349684 | A1 | * | 12/2015 | Tarui | H02P 6/16 318/400.04 |
| 2016/0028342 | A1 | * | 1/2016 | Furukawa | H02M 7/5387 318/503 |
| 2019/0190386 | A1 | * | 6/2019 | Cheng | G05F 1/565 |
| 2020/0313570 | A1 | * | 10/2020 | Hall | H02J 13/00 |
| 2020/0373842 | A1 | * | 11/2020 | Chen | H02M 3/1563 |
| 2022/0158561 | A1 | * | 5/2022 | Lind | H02M 7/219 |

OTHER PUBLICATIONS

International Search Report and Written Opinion, Application No. PCT/US2021/050959 dated Jan. 18, 2022.

* cited by examiner

*Primary Examiner* — Zahid Choudhury
(74) *Attorney, Agent, or Firm* — Greenberg Traurig, LLP (57) ABSTRACT

A method of operating a multiphase power supply includes identifying a least efficient phase of a plurality of phases in the multiphase power supply based on a comparison of a pulse width for each phase in the plurality of phases, and decreasing an amount of power supplied to a load by the identified least efficient phase.

22 Claims, 5 Drawing Sheets

PHASE SHEDDING BASED ON PHASE EFFICIENCY DETERMINED BY PULSE WIDTH MODULATOR SWITCHING OF VOLTAGE REGULATOR FIELD EFFECT TRANSISTORS

BACKGROUND

A voltage regulator, when given a potentially variable input voltage, automatically maintains a constant output voltage level for providing a stable supply voltage for sensitive electronic devices. Voltage regulators are often used in devices such as computer power supplies for stabilizing direct current (DC) voltages used by processors, memory, and other components. Voltage regulators are used to regulate DC and/or alternating current (AC) voltages using electromechanical mechanisms or electronic components.

High power DC to DC voltage regulators commonly used in computing systems can include multiple phases, with each phase contributing to the stable output voltage. Phase shedding is a process of turning off a phase to improve power supply efficiency when less power is being consumed.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A multiphase power supply that supplies power to a load includes multiple phases which each contribute to an output voltage generated by the power supply. When the power supply is supplying power for a variable load, such as a computing system, overall efficiency is increased by phase shedding, in which one or more phases are disabled when the power demanded by the load is decreased. In an ideal multiphase power supply, the power phases are equally efficient, so that the phases share the load equally and each supplies an equal amount of power to the load. However in practice, one or more of the phases can have higher losses due to variations in their component devices even within allowable manufacturing tolerances. For example, device geometry, composition, and other factors can affect the performance of a power phase. Thus, when phase shedding is performed, more efficient phases can be turned off (e.g., when phases are selected for shutoff in numerical order), leading to lower overall efficiency of the power supply.

One embodiment of a multiphase power supply that performs phase shedding in response to decreased power demand identifies the least efficient of its power phases and disables these least efficient phases first when phase shedding is performed. The power supply identifies the least efficient phases by, for each phase, comparing a measured pulse width of the phase with a nominal base pulse width that is calculated based on the input voltage, output voltage, and switching frequency of the power supply. A phase that utilizes a greater ON time in each cycle to deliver the same amount of power as one or more other phases is determined to be less efficient than the other phases. Accordingly, when the power demanded by the load decreases, the phase shedding mechanism disables the identified least efficient phases first. The least efficient phases are the phases that suffer the greatest energy loss (e.g., in the form of heat) for the amount of power supplied by the phase.

Power phases often become less efficient as they degrade over time due to operational stresses. The phase shedding mechanism decreases the amount of time that the least efficient phase is operating and is subject to operational stresses. As a result, the least efficient phase tends to suffer less degradation until another phase becomes less efficient. The phase shedding mechanism thus automatically levels phase wear-out among the multiple phases.

Figure 1:
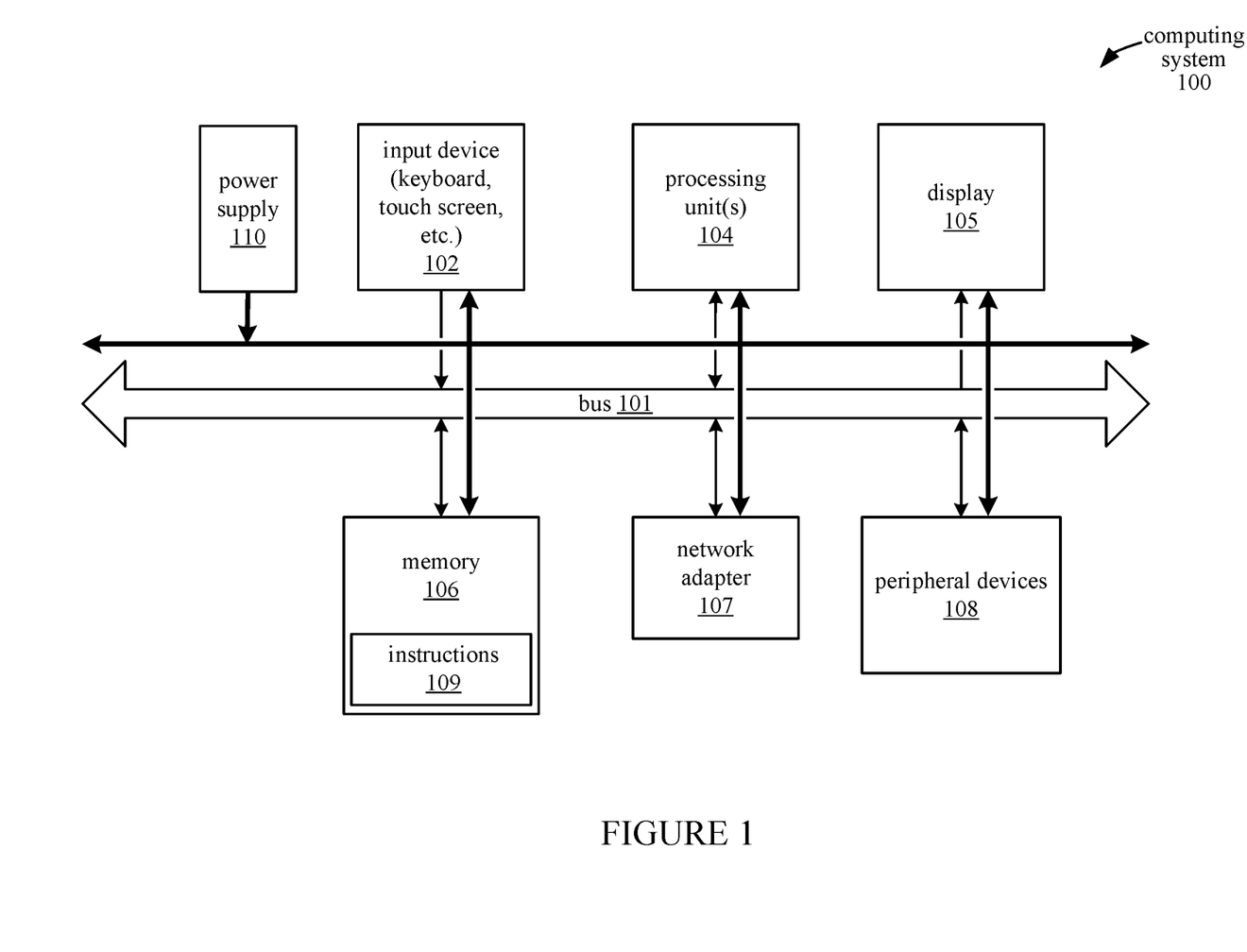
FIG. 1 illustrates a computing system, according to an embodiment.

FIG. 1 illustrates an embodiment of a computing system 100 in which the mechanism for phase shedding based on the above phase efficiency detection mechanism is implemented. In general, the computing system 100 is embodied as any of a number of different types of devices, including but not limited to a laptop or desktop computer, mobile device, server, etc. The computing system 100 includes a number of components 102-108 that communicate with each other through a bus 101. In computing system 100, each of the components 102-108 is capable of communicating with any of the other components 102-108 either directly through the bus 101, or via one or more of the other components 102-108. The components 101-108 in computing system 100 are contained within a single physical enclosure, such as a laptop or desktop chassis, or a mobile phone casing. In alternative embodiments, some of the components of computing system 100 are embodied as peripheral devices such that the entire computing system 100 does not reside within a single physical enclosure.

The computing system 100 also includes user interface devices for receiving information from or providing information to a user. Specifically, the computing system 100 includes an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 may include mass storage devices, location detection devices, sensors, input devices, or other types of devices used by the computing system 100.

Computing system 100 includes one or more processing units 104, which in the case of multiple processing units 104 are capable of operating in parallel. The processing units 104 receive and execute instructions 109 that are stored in the memory subsystem 106. In one embodiment, each of the processing units 104 includes multiple computing nodes that reside on a common integrated circuit substrate. Memory subsystem 106 includes memory devices used by the computing system 100, such as random-access memory (RAM) modules, read-only memory (ROM) modules, hard disks, and other non-transitory computer-readable media.

Some embodiments of computing system 100 may include fewer or more components than the embodiment as illustrated in FIG. 1. For example, certain embodiments are implemented without any display 105 or input devices 102. Other embodiments have more than one of a particular component; for example, an embodiment of computing system 100 could have multiple buses 101, network adapters 107, memory devices 106, etc.

Power is supplied to the components 101-108 in the computing system 100 by a power supply 110. In one embodiment, the power supply 110 is a multiphase power supply that responds to a decrease in power demand by its load (e.g., components 101-108) by disabling its least efficient power phases.

Figure 2:
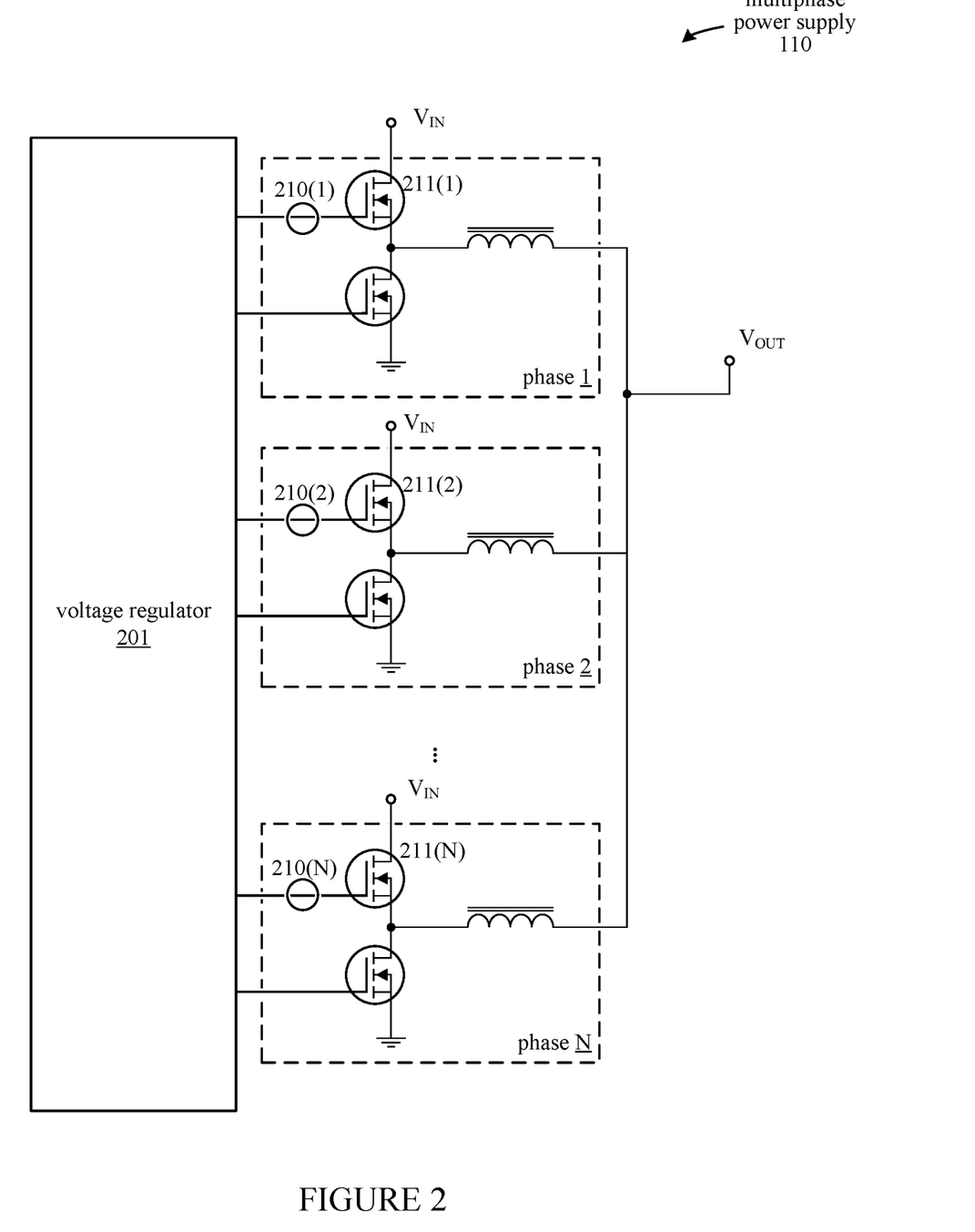
FIG. 2 illustrates phases in a multiphase power supply, according to an embodiment.

FIG. 2 illustrates an embodiment of the multiphase power supply 110, including a voltage regulator 201 and N power phases 1-N. The voltage regulator 201 controls the switching of the field effect transistors (FETs) in each of the phases 1-N to convert an input voltage $V_{IN}$ to a lower stable output voltage $V_{OUT}$. A set of pulse width sensors 210(1)-210(N) in the power supply 110 are used to generate pulse width measurements for each of the phases 1-N, respectively. Each of the pulse width sensors 210(1)-210(N) measures the ON time of the upper FET (e.g., one of 211(1)-211(N)) in its respective phase. For example, the pulse width sensor 210(1) measures the ON time of the upper FET 211(1) in phase 1 based on a voltage measured at the gate of the upper FET 211(1). The phases 1-N in the multiphase power supply 110 are implemented using FETs; however, alternative embodiments utilize other types of switching devices instead of the illustrated FETs, such as bipolar junction transistors (BJTs), insulated-gate bipolar transistors (IGBTs), etc.

Figure 3:
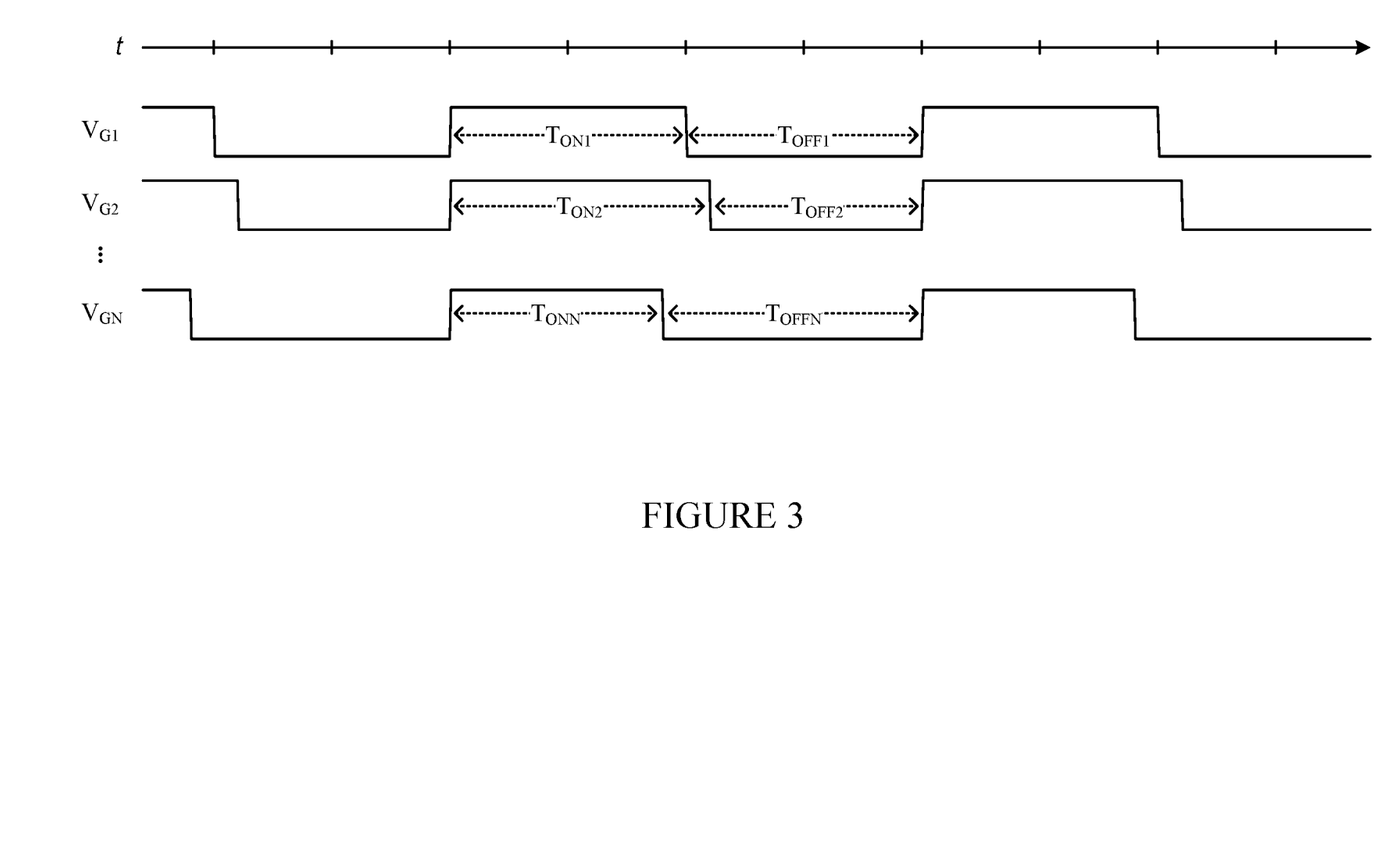
FIG. 3 illustrates voltage waveforms for phases in a multiphase power supply, according to an embodiment.

FIG. 3 is a timing diagram illustrating the voltages $V_{G1}$-$V_{GN}$ over time t, where $V_{G1}$-$V_{GN}$ are measured at the gates of the upper FETs 211(1)-211(N) for each of the respective phases 1-N, according to an embodiment. The pulse widths $T_{ON1}$-$T_{ONN}$ describe the length of time for which the respective FETs 211(1)-211(N) are in their conducting states, while $T_{OFF1}$-$T_{OFFN}$ describe the length of time that the respective FETs 211(1)-211(N) are in their non-conducting states. As shown in FIG. 3, the FET 211(2) in phase 2 is ON for the longest duration (as indicated by the widest pulse $T_{ON2}$), followed by $T_{ON1}$ and $T_{ONN}$.

Figure 4:
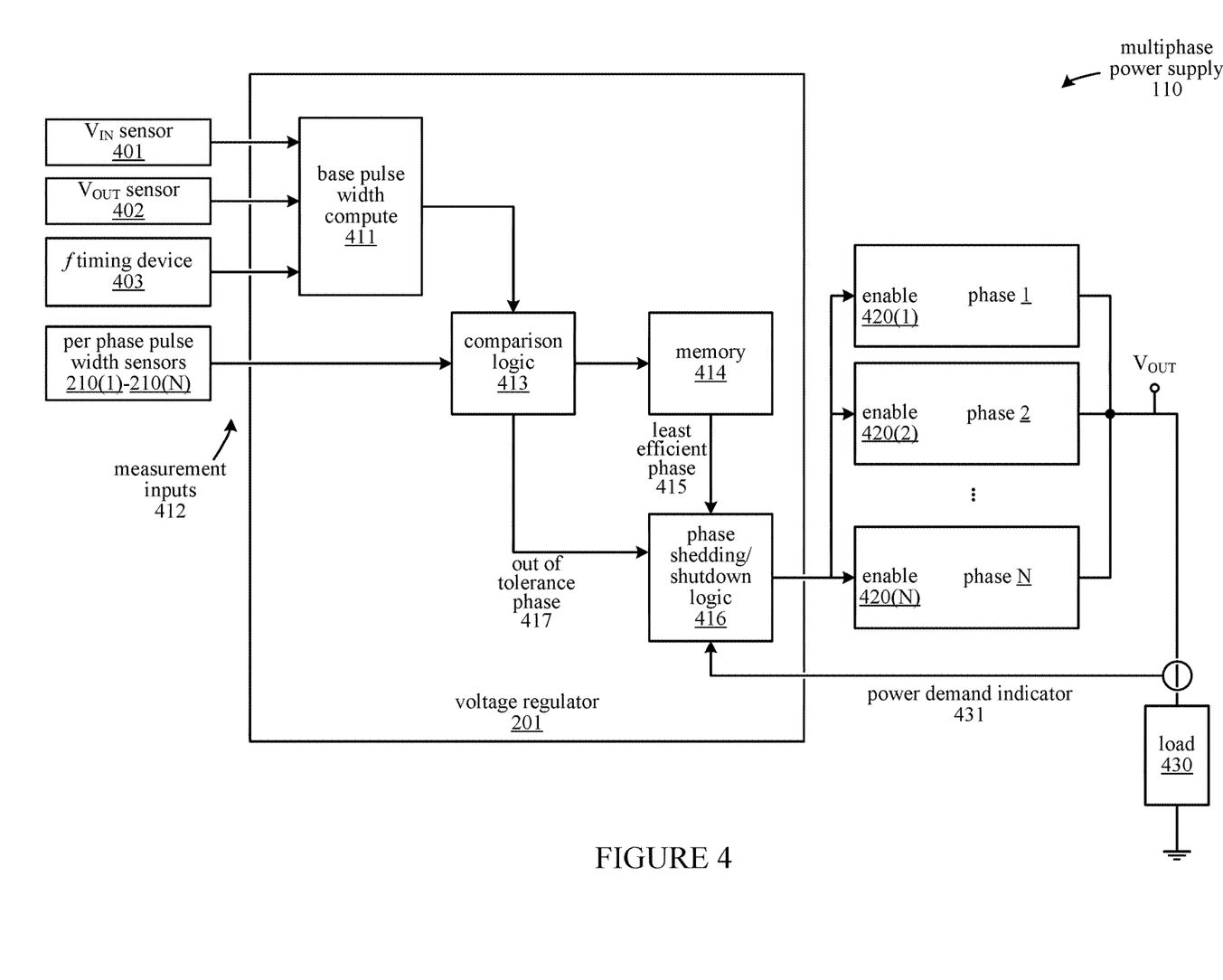
FIG. 4 illustrates components in a multiphase power supply, according to an embodiment.

FIG. 4 illustrates an embodiment of a multiphase power supply 110 that supplies power to a load 430, such as components of the computing system 100. The components of the multiphase power supply 110 are implemented in hardware circuitry or a combination of hardware circuitry and software and/or firmware components. In various embodiments, computations in the power supply 110 are performed using digital logic circuits or, alternatively, using analog circuits and signals.

The multiphase power supply 110 includes a voltage regulator 201 that identifies a least efficient power phase from among the phases 1-N by comparing the measured pulse widths of the phases 1-N. In one embodiment, the power phase having the widest measured pulse width (i.e., the longest ON time per cycle) is identified as the least efficient phase. In one embodiment, phases are additionally ranked by their efficiency according to their measured pulse widths, with wider pulse widths corresponding to lower efficiency. The voltage regulator 201 detects a decrease in the power demanded by the load 430 and responds by performing phase shedding to disable one or more of the power phases 1-N. The voltage regulator 201 selects the least efficient phase or phases for disabling (i.e., disabling the phase(s) that is/are the extrema (extremum) from a lack of efficiency perspective), thus decreasing the amount of power supplied to the load 430 by the identified least efficient phase or phases. As a result, the overall efficiency of the power supply increases.

The voltage regulator 201 includes a compute unit 411 for calculating a base duty cycle and active pulse width (representing the ON time of the upper FET in an ideal phase) based on measured values of $V_{IN}$ and $V_{OUT}$ and the switching frequency f of the phases 1-N. The duty cycle D and pulse width TON are calculated according to Equation 1 below.

$$D = T_{ON} \times f = \frac{T_{ON}}{T_{ON} + T_{OFF}} = \frac{V_{OUT}}{V_{IN}} \quad \text{(Equation 1)}$$

As shown in Equation 1, the duty cycle depends on the input voltage $V_{IN}$ supplied to the power phases 1-N and the output voltage $V_{OUT}$ that is generated at the output of the power phases 1-N and applied to the load 430. When the power supply 110 is in use, the input voltage $V_{IN}$ can vary over time (e.g., when $V_{IN}$ is provided from an unregulated source). Thus, a $V_{IN}$ sensor 401 measures the value of the input voltage $V_{IN}$ for each cycle during the operation of the power supply 110. The output voltage $V_{OUT}$ also varies over time (e.g., due to changes in power demanded by the load 430, or due to changes within operational tolerances). Thus, the $V_{OUT}$ sensor 402 measures $V_{OUT}$ for each cycle during the operation of power supply 110. The switching frequency f is determined at design time, and is provided by a counter, timer, or other timing device 403.

The $V_{IN}$ sensor 401, $V_{OUT}$ sensor 402, and timing device 403 transmit the values for $V_{IN}$, $V_{OUT}$, and f, respectively, via a set of measurement inputs 412 to the compute unit 411 in the voltage regulator 201. The compute unit 411 calculates, according to Equation 1, the base (i.e., nominal) duty cycle D and the base active pulse width TON (i.e., a nominal upper FET ON time) for the current cycle.

In normal operation, individual phases can suffer losses occurring outside of the switching device area (e.g., due to factors such DC resistance (DCR) in the printed circuit board, etc.) that change the actual duty cycle and pulse width for each phase so that they differ from the calculated base duty cycle and pulse width. Therefore, the actual pulse width is measured for each of the phases so it can be compared with the calculated base pulse width. The voltage regulator 201 receives via the measurement inputs 412 a set of pulse width measurements $T_{ON1}$-$T_{ONN}$ from the pulse width sensors 210(1)-210(N) of the respective phases 1-N. The pulse width measurements include a measured pulse width indicating the ON time of the upper FET for each of the phases 1-N.

In the voltage regulator 201, the comparison logic 413 performs a set of comparisons by determining a difference between each of the pulse width measurements $T_{ON1}$-$T_{ONN}$ and the calculated base pulse width TON. The comparison logic 413 identifies the phase associated with the greatest difference as the least efficient phase of the phases 1-N. In one embodiment, the comparison logic 413 also determines the relative efficiencies of the phases (i.e., ranks the phases by their determined efficiencies) for use in predictions or other calculations.

The pulse width sensors 210(1)-210(N) do not generate a valid pulse width measurement for phases that are not in operation, such as phases that were previously disabled due to phase shedding or an out-of-tolerance shutdown. Accordingly, the comparison logic 413 excludes phases from the calculation that are not currently in operation. As a result, the least efficient phase identified by the comparison logic 413 is the least efficient among the currently operating phases.

The difference calculated for each phase is also used to determine whether the phase is operating outside an acceptable duty cycle tolerance. In an alternative embodiment, the comparison logic 413 compares the pulse widths $T_{ON1}$-$T_{ONN}$ for the phases, and identifies the phase from which the widest pulse width was measured as the least efficient phase. In one embodiment, the comparison logic 413 performs the comparisons using digital logic; alternatively, the logic 413 performs the comparisons using analog signals and components.

In one embodiment, the pulse widths $T_{ON1}$-$T_{ONN}$ of each phase 1-N are measured at every cycle, so that the pulse width of each consecutive pulse occurring in each phase is measured. Accordingly, the base pulse width TON is calculated and the comparisons performed by the comparison logic 413 are also performed at every cycle. That is, a comparison is performed by the comparison logic 413 to determine the least efficient phase or phases for each of the consecutive phase cycles of the multiphase power supply.

The memory 414 records an identifier for the least efficient phase as determined by the comparison logic 413. In some embodiments, the memory 414 also records historical data, such as the most recently measured pulse widths $T_{ON1}$-$T_{ONN}$ for each of the phases 1-N and the most recently calculated base duty cycles, base pulse widths, and/or phase efficiency rankings. The information stored in the memory 414 is used for predictive failure analysis or other advanced calculations or controls. In various embodiment, the memory 414 can be a register, counter, memory cells, etc., and can be implemented using any of a number of volatile or non-volatile memory technologies such as, for example, dynamic random access memory (DRAM), static random access memory (SRAM), electrically erasable programmable read-only memory (EEPROM), flash memory, or another memory technology. While FIG. 4 illustrates the memory 414 as being included in the voltage regulator 201, in alternative embodiments the memory 414 is external to the voltage regulator 201.

The phase shedding logic unit 416 decreases the number of phases 1-N that are operating in response to a decrease in the power demanded by the load 430. The phase shedding logic 416 also increases the number of operational phases when the power demand increases. When the phase shedding logic 416 receives a power demand indicator 431 (e.g., determined from load current and/or voltage measurements) that indicates a decrease in the power demand from the load 430, the phase shedding logic 416 decreases the amount of power supplied to the load 430 by the least efficient currently operating phase by disabling the least efficient phase. The phase shedding logic 416 shuts down the phase by reading from the memory 414 the most recently recorded identifier 415, which identifies the least efficient phase.

In various embodiments, disabling of the least efficient phase is accomplished by deasserting one or more switching control signals of the phase, such as a pulse width modulated (PWM) switching signal or gate drive signals (e.g., periodic signals that control the switching of the upper and lower FETs in the phase), depending on the design of the phase. In one embodiment, one or more switching control signals (e.g., a PWM signal or gate drive signals) of a phase are turned off (e.g., deasserted) and on when the enable signal for the phase is respectively deasserted and asserted. As illustrated in FIG. 4, the phase shedding logic 416 disables the phase corresponding to the identifier 415 by deasserting the enable signal (i.e., one of the signals 420(1)-420(N)) that corresponds to the least efficient phase. In an alternative embodiment, the phase shedding logic 416 stops the transmission of the one or more switching control signals from the voltage regulator 201 to the least efficient phase. When a least efficient phase 415 cannot be determined, the phase shedding logic 416 falls back on an alternative method for selecting the phase to disable, such as selecting the phases in sequence, or selecting the phase through which the highest amount of current is flowing.

When the phase shedding logic 416 receives an indication 431 that the power demand of the load 430 has increased, the phase shedding logic 416 enables one of the previously disabled phases. In one embodiment, the phase shedding logic 416 enables the most efficient (i.e., the extrema of the phases from a most efficient perspective) of the disabled phases as identified in the memory 414. Alternatively, the phase shedding logic 416 enables the most recently disabled phase.

In one embodiment, the phase shedding logic 416 additionally includes shutdown logic for disabling any phases that exceed a duty cycle tolerance threshold. For each of the phases 1-N, if the pulse width or duty cycle measured for the phase differs by more than a threshold amount or percentage from the base duty cycle D or pulse width TON, the comparison logic 413 identifies the out-of-tolerance phase 417 to the phase shedding and shutdown logic 416, which disables the phase.

Figure 5:
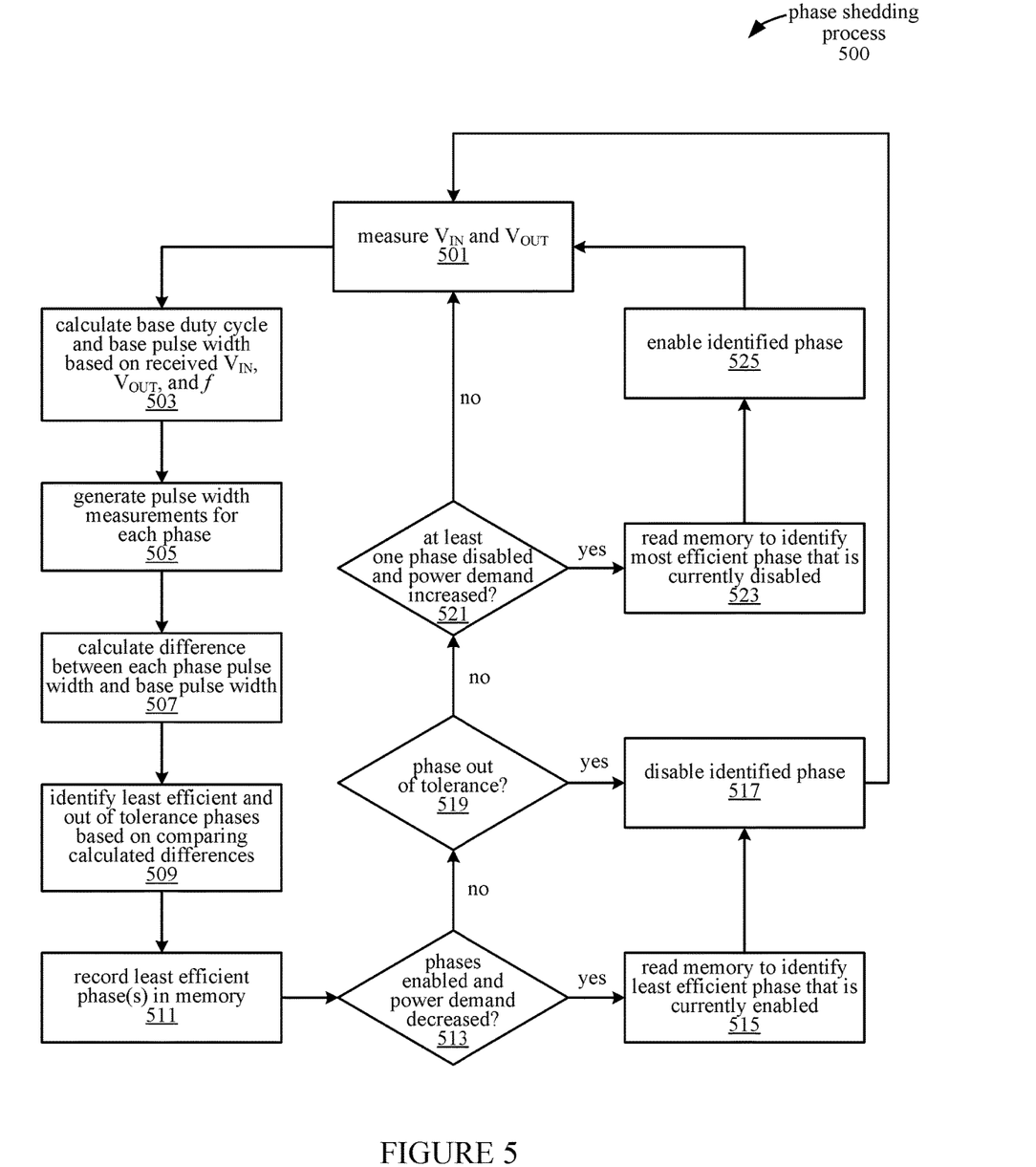
FIG. 5 illustrates a process for performing phase shedding, according to an embodiment.

FIG. 5 illustrates a phase shedding process 500 that determines the least efficient phase or phases in a multiphase power supply 110 and disables the least efficient phase or phases first when performing phase shedding in response to decreases in power demand, according to an embodiment. When power demand increases, the most efficient phases that were previously disabled are re-enabled first. The process 500 is performed by circuit components in the multiphase power supply 110, according to an embodiment.

At block 501 of the phase shedding process 500, the input voltage sensor 401 and the output voltage sensor 402 measure the input voltage $V_{IN}$ and the output voltage $V_{OUT}$, respectively, of the multiphase power supply 110. The measured values for $V_{IN}$ and $V_{OUT}$ are received by the compute unit 411 along with the switching frequency f provided by the timing device 403, as provided at block 503, and are used by the compute unit 411 to calculate a base pulse width TON.

At block 505, the pulse width sensors 210(1)-210(N) generate a set of N pulse width measurements by measuring a pulse width for each of the phases 1-N in the multiphase power supply 110. The comparison logic 413, at block 507, determines a set of N differences, including a difference between each of the pulse width measurements $T_{ON1}$-$T_{ONN}$ and the base pulse width TON. At block 509, the comparison logic 413 identifies the least efficient phase or phases based on comparing the differences, where the differences exceeding the base pulse width by the greatest duration indicate the least efficient phases. In one embodiment, phases having wider pulse width measurements (i.e., longer pulses) are identified as less efficient than phases having narrower pulse width measurements (i.e., shorter pulses). The comparison logic 413 also identifies any phases that are operating with duty cycles that are out of tolerance (e.g., exceeding the base duty cycle by more than a threshold percentage), based on the previously calculated differences. At block 511, identifiers of the least efficient phase or phases are recorded in memory 414. In some embodiments, the memory 414 stores the calculated duty cycle, pulse width, and/or other values for the most recent cycles for performing predictive failure analysis or other computations.

At block 513, the phase shedding logic 416 determines whether more than one of the phases are enabled and the power demand indicator 431 indicates a decrease in the power demanded by the load 430. For example, the decrease may be indicated when the total power demanded by the load 430 becomes lower than a preset threshold or has decreased into a lower range of a set of predefined ranges. If both conditions are true (i.e., more than one phase is enabled and the power demand is sufficiently decreased), then the phase shedding logic 416 decreases the amount of power supplied to the load 430 by the least efficient power phase in accord with blocks 515 and 517. At block 515, the phase shedding logic 416 reads the previously recorded identifier of the least efficient phase from the memory 414. The phase shedding logic 416 disables the phase corresponding to the identifier at block 517 (e.g., by deasserting an enable signal for the phase). In one embodiment, the phase shedding logic 416 disables the least efficient phase by terminating the transmission of one or more gate drive signals to the phase. From block 517, the process 500 returns to block 501 to identify the least efficient power phase for the next cycle.

At block 513, if only one phase is enabled, then phase shedding is not performed so that the last remaining phase is not disabled. Also, if the power demand indicator 431 does not indicate a sufficient decrease in the power demanded by the load 430, then phase shedding is not performed, and the process 500 continues at block 519.

At block 519, if the phase shedding logic 416 receives an indication 417 from the comparison logic 413 that one of the phases has an out-of-tolerance duty cycle (as determined at block 509), then the phase identified by the comparison logic 413 as being out-of-tolerance is disabled at block 517. In one embodiment, the out-of-tolerance phase is recorded as being disabled due to an out-of-tolerance condition so it is not re-enabled by the phase shedding mechanism or other mechanisms. From block 517, the process 500 returns to block 501 to identify the least efficient power phase for the next cycle.

At block 519, if no indication 417 that a phase has an out-of-tolerance duty cycle is received, the process 500 continues at block 521. At block 521, the phase shedding logic determines whether at least one of the phases is currently disabled by the phase shedding mechanism and whether the power demand indicator 431 indicates that the power demanded by the load 430 has increased. For example, the increase may be indicated when the total power demanded by the load 430 exceeds a preset threshold, or is determined to have increased into a particular range. If both conditions are true (i.e., at least one phase was previously disabled by phase shedding, and the power demand has sufficiently increased), the phase shedding logic 416 increases the amount of power supplied to the load 430 by adding or enabling the most efficient of the one or more disabled power phases in accord with blocks 523 and 525. At block 523, the phase shedding logic 416 accesses the memory 414 to identify the most efficient phase that is currently disabled by prior phase shedding. In one embodiment, the most efficient disabled phase is the phase most recently disabled by the phase shedding logic 416. Once identified, the most efficient disabled phase is re-enabled at block 525. Thus, phases are re-enabled in the order of their efficiency, with more efficient phases being re-enabled first. In one embodiment, the phase shedding logic 416 re-enables the most efficient of the disabled phases (which was previously identified as a least efficient of the enabled phases) by resuming the one or more switching control signals of the phase. From block 525, the process 500 returns to block 501 to identify the least efficient power phase for the next cycle.

At block 521, if all of the phases are enabled or the power demand has not increased, then the process 500 returns to block 501. Process 500 is thus repeated as shown in blocks 501-525 to identify a least efficient power phase for each cycle of the multiphase power supply 110. The operations for identifying the least efficient phase represented by blocks 501-513 are thus performed for each consecutive phase cycle of the multiphase power supply.

On a subsequent iteration of the process 500 after the least efficient phase has been disabled by the phase shedding logic 416, the comparison logic 413 at block 509 identifies the next least efficient phase, which is more efficient than the already disabled phase and less efficient than any of the phases still operating. In response to a further decrease in the power demand, the phase shedding logic 416 disables the next least efficient phase. In this manner, the phases are disabled in an order determined by their efficiencies, with the least efficient phases being disabled first. As a result, the more efficient phases are used for a greater amount of time than the less efficient phases, increasing the overall efficiency of the multiphase power supply.

A method of operating a multiphase power supply includes generating a plurality of pulse width measurements by measuring a pulse width for each phase of a plurality of phases in the multiphase power supply, identifying a least efficient phase of the plurality of phases based on performing a comparison of the plurality of pulse width measurements, and decreasing an amount of power supplied to a load by the identified least efficient phase.

In the method, decreasing the amount of power supplied to the load includes disabling the identified least efficient phase in response to detecting a first decrease in a power demand of the load.

The method, further includes identifying a next least efficient phase of the plurality of phases based on the comparison of the plurality of pulse width measurements, and disabling the next least efficient phase in response to detecting a second decrease in the power demand of the load.

The method further includes measuring an input voltage of the multiphase power supply, measuring an output voltage of the multiphase power supply, where the output voltage is applied to the load, calculating a base pulse width based on a switching frequency of the multiphase power supply, the measured input voltage, and the measured output voltage. Performing the comparison of the plurality of pulse width measurements comprises determining a difference between each of the pulse width measurements and the base pulse width.

In the method, decreasing the amount of power supplied to the load by the identified least efficient phase includes deasserting one or more switching control signals of the identified least efficient phase.

The method also includes recording an identifier of the least efficient phase in a memory device. Decreasing the amount of power supplied to the load by the identified least efficient phase includes reading the recorded identifier from the memory device, and disabling the least efficient phase corresponding to the recorded identifier.

In the method, the identifying the least efficient phase includes identifying the phase of the plurality of phases having the widest pulse width measurement as the least efficient phase.

In the method, the comparison of the plurality of pulse width measurements is one of a plurality of comparisons, and each of the plurality of comparisons is performed for one of a plurality of consecutive phase cycles of the multiphase power supply.

A multiphase power supply includes an input for receiving a plurality of pulse width measurements, where the plurality of pulse width measurements includes a measured pulse width for each phase of a plurality of phases in the multiphase power supply, a comparison logic unit coupled with the input for identifying a least efficient phase of the plurality of phases based on performing a comparison of the plurality of pulse width measurements, and phase shedding logic coupled with the comparison logic unit for decreasing an amount of power supplied to a load by the identified least efficient phase.

In the multiphase power supply, the phase shedding logic decreases the amount of power supplied to the load by disabling the identified least efficient phase in response to detecting a decrease in power demand of the load.

The multiphase power supply further includes an input voltage sensor for measuring an input voltage of the multiphase power supply, an output voltage sensor for measuring an output voltage of the multiphase power supply, where the output voltage is applied to the load, and a base pulse width compute unit for calculating a base pulse width based on a switching frequency of the multiphase power supply, the measured input voltage, and the measured output voltage. The comparison logic unit performs the comparison of the plurality of pulse width measurements by determining a difference between each of the pulse width measurements and the base pulse width.

In the multiphase power supply, the phase shedding logic decreases the amount of power supplied to the load by the identified least efficient phase by deasserting one or more switching control signals of the identified least efficient phase.

The multiphase power supply, further includes a memory coupled with the comparison logic unit for recording an identifier of the least efficient phase. The phase shedding logic decreases the amount of power supplied to the load by the identified least efficient phase by reading the recorded identifier from the memory, and disabling the least efficient phase corresponding to the recorded identifier.

In the multiphase power supply, the comparison logic unit identifies the phase of the plurality of phases having the widest pulse width measurement as the least efficient phase.

In the multiphase power supply, the comparison logic unit performs a plurality of comparisons including the comparison of the plurality of pulse width measurements, and each of the plurality of comparisons is performed for one of a plurality of consecutive phase cycles of the multiphase power supply.

A computing system includes a plurality of power phases, a set of one or more pulse width sensors for generating a plurality of pulse width measurements by measuring a pulse width for each power phase of the plurality of power phases, and a voltage regulator coupled with the plurality of power phases for identifying a least efficient phase of the plurality of power phases based on performing a comparison of the plurality of pulse width measurements, and decreasing an amount of power supplied to a load by the identified least efficient phase.

In the computing system, the voltage regulator identifies the power phase of the plurality of power phases having the widest pulse width measurement as the least efficient phase, and decreases the amount of power supplied to the load by disabling the identified least efficient phase in response to detecting a first decrease in power demand of the load.

The computing system, further includes an input voltage sensor configured to measure an input voltage supplied to the plurality of power phases, and an output voltage sensor configured to measure an output voltage generated by the plurality of power phases. The voltage regulator calculates a base pulse width based on a switching frequency of the plurality of power phases, the measured input voltage, and the measured output voltage, and performs the comparison of the plurality of pulse width measurements based on determining a difference between each of the pulse width measurements and the base pulse width.

In the computing system, the voltage regulator further includes memory for recording an identifier of the least efficient phase. The voltage regulator decreases the amount of power supplied to the load by the identified least efficient phase by reading the recorded identifier from the memory, and disabling the least efficient phase corresponding to the recorded identifier.

The computing system further includes the load. The load includes a set of one or more processing units, a memory system, and one or more peripheral devices.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method of operating a multiphase power supply, comprising:
   comparing pulse widths of a plurality of phases in the multiphase power supply with each other to identify a least efficient phase of the plurality of phases based on a difference between each pulse width and a base pulse width; and
   decreasing an amount of power supplied to a load by the identified least efficient phase.

2. The method of claim 1, further comprising:
   generating a plurality of pulse width measurements by measuring a pulse width for each phase of the plurality of phases in the multiphase power supply.

3. The method of claim 1, wherein decreasing the amount of power supplied to the load comprises disabling the identified least efficient phase in response to detecting a first decrease in a power demand of the load.

4. The method of claim 3, further comprising:
   identifying a next least efficient phase of the plurality of phases based on the comparing of the pulse widths of the plurality of phases; and
   disabling the next least efficient phase in response to detecting a second decrease in the power demand of the load.

5. The method of claim 1, further comprising:
   measuring an input voltage of the multiphase power supply;
   measuring an output voltage of the multiphase power supply, wherein the output voltage is applied to the load; and
   calculating the base pulse width based on a switching frequency of the multiphase power supply, the measured input voltage, and the measured output voltage.

6. The method of claim 1, wherein decreasing the amount of power supplied to the load by the identified least efficient phase comprises deasserting one or more switching control signals of the identified least efficient phase.

7. The method of claim 1, further comprising:
   recording an identifier of the least efficient phase in a memory device, wherein decreasing the amount of power supplied to the load by the identified least efficient phase comprises:
   reading the recorded identifier from the memory device, and
   disabling the least efficient phase corresponding to the recorded identifier.

8. The method of claim 1, wherein:
   for each phase in the plurality of phases, the comparing of the pulse widths is one of a plurality of comparisons; and
   each of the plurality of comparisons is performed for one of a plurality of consecutive phase cycles of the multiphase power supply.

9. The method of claim 1, wherein the identifying the least efficient phase comprises identifying the phase of the plurality of phases having a widest pulse width as the least efficient phase.

10. A multiphase power supply, comprising:
    an input configured to receive a plurality of pulse width measurements, wherein the plurality of pulse width measurements includes a measured pulse width for each phase of a plurality of phases in the multiphase power supply;
    a comparison logic unit coupled with the input and configured to compare the plurality of pulse width measurements with each other to identify a least efficient phase of the plurality of phases based on a difference between each of the pulse width measurements and a base pulse width; and
    phase shedding logic coupled with the comparison logic unit and configured to decrease an amount of power supplied to a load by the identified least efficient phase.

11. The multiphase power supply of claim 10, wherein the phase shedding logic is configured to decrease the amount of power supplied to the load by the identified least efficient phase by disabling the identified least efficient phase in response to detecting a decrease in power demand of the load.

12. The multiphase power supply of claim 10, further comprising:
    an input voltage sensor configured to measure an input voltage of the multiphase power supply;
    an output voltage sensor configured to measure an output voltage of the multiphase power supply, wherein the output voltage is applied to the load; and
    a base pulse width compute unit configured to calculate the base pulse width based on a switching frequency of the multiphase power supply, the measured input voltage, and the measured output voltage.

13. The multiphase power supply of claim 10, wherein:
    the phase shedding logic is further configured to decrease the amount of power supplied to the load by the identified least efficient phase by deasserting one or more switching control signals of the identified least efficient phase.

14. The multiphase power supply of claim 10, further comprising:
a memory coupled with the comparison logic unit and configured to record an identifier of the least efficient phase, wherein the phase shedding logic is configured to decrease the amount of power supplied to the load by the identified least efficient phase by:
reading the recorded identifier from the memory, and
disabling the least efficient phase corresponding to the recorded identifier.

15. The multiphase power supply of claim 10, wherein:
the comparison logic unit is configured to perform a plurality of comparisons including the comparison of the plurality of pulse width measurements; and
each of the plurality of comparisons is performed for one of a plurality of consecutive phase cycles of the multiphase power supply.

16. The multiphase power supply of claim 10, wherein the comparison logic unit is configured to identify the phase of the plurality of phases having a widest pulse width measurement as the least efficient phase.

17. A computing system, comprising:
a plurality of power phases;
a set of one or more pulse width sensors configured to generate a plurality of pulse width measurements by measuring a pulse width for each power phase of the plurality of power phases; and
a voltage regulator coupled with the plurality of power phases and configured to:
compare the plurality of pulse width measurements with each other to identify a least efficient phase of the plurality of power phases based on a difference between each of the pulse width measurements and a base pulse width, and
decrease an amount of power supplied to a load by the identified least efficient phase.

18. The computing system of claim 17, wherein the voltage regulator is configured to:
decrease the amount of power supplied to the load by the identified least efficient phase by disabling the identified least efficient phase in response to detecting a first decrease in power demand of the load.

19. The computing system of claim 17, further comprising:
an input voltage sensor configured to measure an input voltage supplied to the plurality of power phases; and
an output voltage sensor configured to measure an output voltage generated by the plurality of power phases, wherein the voltage regulator is further configured to:
calculate the base pulse width based on a switching frequency of the plurality of power phases, the measured input voltage, and the measured output voltage.

20. The computing system of claim 17, wherein the voltage regulator further comprises memory configured to record an identifier of the least efficient phase, wherein the voltage regulator is configured to decrease the amount of power supplied to the load by the identified least efficient phase by:
reading the recorded identifier from the memory, and
disabling the least efficient phase corresponding to the recorded identifier.

21. The computing system of claim 17, further comprising the load, wherein the load comprises:
a set of one or more processing units;
a memory system; and
one or more peripheral devices.

22. A method of operating a multiphase power supply, comprising:
comparing pulse widths of a plurality of phases in the multiphase power supply with each other to identify extremums of the plurality of phases based on a difference between each of the pulse widths and a base pulse width; and
decreasing an amount of power supplied to a load by a least efficient phase of the extremums of the plurality of phases; or
increasing an amount of power supplied to the load by a most efficient phase of the extremums of the plurality of phases.

* * * * *